(12) United States Patent
Hoggarth et al.

(10) Patent No.: US 10,275,076 B2
(45) Date of Patent: Apr. 30, 2019

(54) VEHICLE HUMAN INTERFACE ASSEMBLY

(71) Applicant: Ford Global Technologies, LLC, Dearborn, MI (US)

(72) Inventors: Marcus Hoggarth, Hertfordshire (GB); Yeawon Choi, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/419,123

(22) Filed: Jan. 30, 2017

(65) Prior Publication Data

US 2017/0228089 A1   Aug. 10, 2017

(30) Foreign Application Priority Data

Feb. 5, 2016   (GB) .................................. 1602125.5

(51) Int. Cl.
*G06F 3/041* (2006.01)
*G06F 3/044* (2006.01)
(Continued)

(52) U.S. Cl.
CPC ............ *G06F 3/0416* (2013.01); *B60K 37/06* (2013.01); *G06F 3/0304* (2013.01); *G06F 3/03547* (2013.01); *G06F 3/042* (2013.01); *G06F 3/044* (2013.01); *G06F 3/045* (2013.01); *G06F 3/04847* (2013.01); *G06F 3/04883* (2013.01);
(Continued)

(58) Field of Classification Search
CPC ................ B60K 37/06; B60K 2350/40; B60K 2350/1024; B60K 2350/1036; B60K 2350/1052; G06F 3/0416; G06F 3/0304; G06F 3/03547; G06F 3/042; G06F 3/044;
(Continued)

(56) References Cited

U.S. PATENT DOCUMENTS

| 4,934,470 A | 6/1990 | Berthold et al. | |
| 7,436,398 B2 * | 10/2008 | Yuasa | B60K 37/06 200/5 A |

(Continued)

FOREIGN PATENT DOCUMENTS

| CA | 1306777 C | 8/1992 |
| EP | 0005996 A1 | 12/1979 |

(Continued)

*Primary Examiner* — Sardis F Azongha
(74) *Attorney, Agent, or Firm* — Vichit Chea; Price Heneveld LLP

(57) ABSTRACT

A vehicle human interface assembly has an interior trim portion of a vehicle, a flexible membrane, and a frame defining an opening. The flexible membrane extends over the opening such that the flexible membrane is in tension and is capable of being depressed by a user to form a depression in the membrane in a range of locations within the opening. One or more flexible membrane sensors are configured to determine the location at which the flexible membrane has been depressed by the user and provide a signal indicating the location at which the flexible membrane has been depressed. A controller is configured to control one or more systems of the vehicle based on the signal from the one or more flexible membrane sensors. The frame is provided in the interior trim portion such that the flexible membrane and a surrounding surface of the interior trim portion are substantially flush.

20 Claims, 8 Drawing Sheets

(51) Int. Cl.
  *G06F 3/045* (2006.01)
  *B60K 37/06* (2006.01)
  *G06F 3/0488* (2013.01)
  *G06F 3/03* (2006.01)
  *G06F 3/042* (2006.01)
  *G06F 3/0484* (2013.01)
  *G06F 3/0354* (2013.01)

(52) U.S. Cl.
  CPC ............... *B60K 2350/1024* (2013.01); *B60K 2350/1036* (2013.01); *B60K 2350/40* (2013.01); *G06F 2203/04102* (2013.01); *G06F 2203/04108* (2013.01)

(58) Field of Classification Search
  CPC .. G06F 3/045; G06F 3/04847; G06F 3/04883; G06F 3/0414; G06F 3/0421
  See application file for complete search history.

(56) References Cited

U.S. PATENT DOCUMENTS

| | | | |
|---|---|---|---|
| 8,253,712 B2 * | 8/2012 | Klinghult | G06F 3/0412 345/173 |
| 8,926,107 B2 * | 1/2015 | Geyl | B60K 37/06 362/23.05 |
| 9,063,627 B2 * | 6/2015 | Yairi | G06F 3/044 |
| 9,355,805 B2 * | 5/2016 | Nishito | G06F 3/03547 |
| 9,440,536 B2 * | 9/2016 | Toggweiler | B60K 37/02 |
| 9,701,201 B2 * | 7/2017 | Joo | B60N 2/002 |
| 9,766,742 B2 * | 9/2017 | Papakostas | G06F 3/0416 |
| 9,811,200 B2 * | 11/2017 | Lee | G06F 3/0416 |
| 2003/0026971 A1 | 2/2003 | Inkster et al. | |
| 2007/0051591 A1 | 3/2007 | Otsuka et al. | |
| 2009/0300531 A1 | 12/2009 | Pryor | |
| 2011/0018826 A1 | 1/2011 | Shoji | |
| 2014/0253503 A1 | 9/2014 | Ejlersen | |
| 2016/0320939 A1 * | 11/2016 | Min | G06F 3/0488 |
| 2017/0031496 A1 * | 2/2017 | Joo | G06F 3/04883 |
| 2018/0006646 A1 * | 1/2018 | Moriyasu | H03K 17/962 |

FOREIGN PATENT DOCUMENTS

| | | |
|---|---|---|
| WO | 2015041268 A1 | 3/2015 |
| WO | 2015106183 A1 | 7/2015 |

* cited by examiner

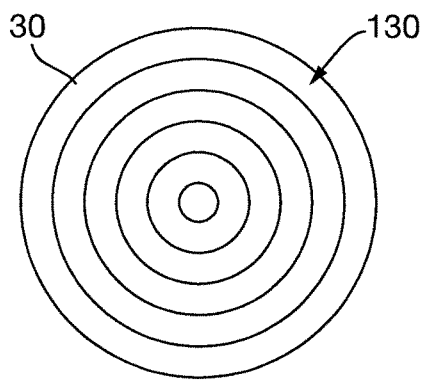
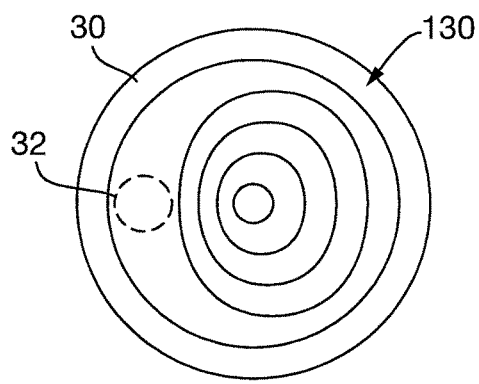
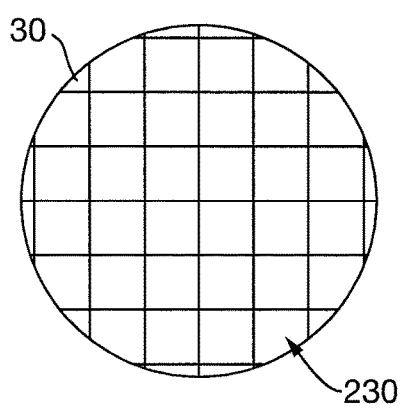
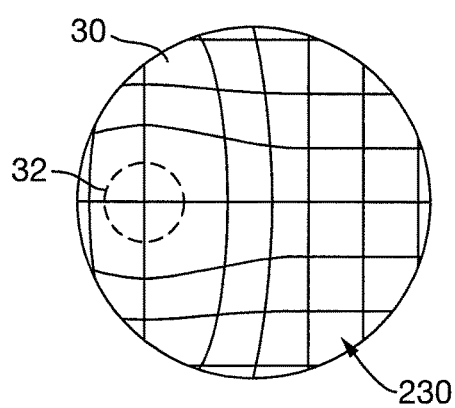
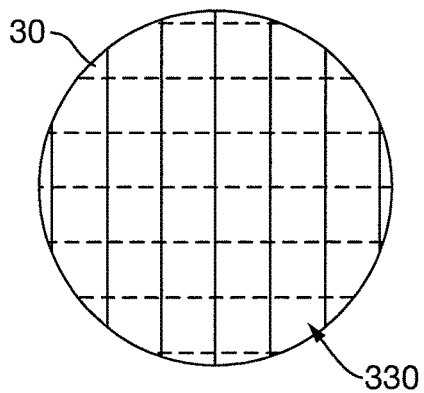

VEHICLE HUMAN INTERFACE ASSEMBLY

FIELD OF THE INVENTION

This disclosure relates generally to a vehicle human interface assembly and, more particularly, relates to a vehicle human interface assembly comprising a depressible flexible membrane that can control systems of the vehicle.

BACKGROUND OF THE INVENTION

The number and complexity of user controllable systems in motor vehicles has generally increased. For example, many motor vehicles now have controllable audio systems, adjustable seats, adjustable mirrors, climate control systems, lighting, navigation systems, communication systems etc. Each of these systems typically requires a user interface device, e.g. in the form of switches, dials or knobs, and the number of such user interface devices has increased with the proliferation of user controllable systems. Furthermore, such controls are often individual to the particular occupant of the vehicle, thereby further exacerbating the proliferation of the user interface devices. This can present a cluttered and bewildering arrangement to the user. It is desirable to simplify and reduce this clutter.

SUMMARY OF THE INVENTION

According to one aspect of the present invention, a motor vehicle human interface assembly is provided. The vehicle human interface assembly includes an interior trim portion of a vehicle, a flexible membrane, and an opening, the flexible membrane extending over the opening such that the flexible membrane is in tension, wherein the flexible membrane is capable of being depressed by a user to form a depression in the membrane in a range of locations within the opening. The vehicle human interface assembly also includes one or more flexible membrane sensors configured to determine the location at which the flexible membrane has been depressed by the user, the one or more flexible membrane sensors providing a signal indicating the location at which the flexible membrane has been depressed. The vehicle human interface assembly further includes a controller configured to control one or more systems of the vehicle based on the signal from the one or more flexible membrane sensors. The frame is provided in the interior trim portion such that the flexible membrane and a surrounding surface of the interior trim portion are substantially flush.

According to another aspect of the present invention, a vehicle interface assembly is provided. The vehicle interface assembly includes an opening provided in a vehicle, and a flexible membrane extending over the opening under tension and capable of being depressed by a user to form a depression in the membrane. The assembly also includes one or more flexible membrane sensors configured to determine a depressed location of the member within the opening, and a controller controlling one or more systems based on the depressed location.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 9a and 9b are underside views of a flexible membrane of the human interface assembly of FIG. 8, with FIG. 9a showing the flexible membrane in an undepressed state and FIG. 9b showing the flexible membrane in a depressed state;

FIGS. 10a and 10b are underside views of a flexible membrane of a human interface assembly of FIG. 8, with FIG. 10a showing the flexible membrane in an undepressed state and FIG. 10b showing the flexible membrane in a depressed state; and FIG. 11 is a schematic view of a flexible membrane of a human interface assembly of FIG. 8.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
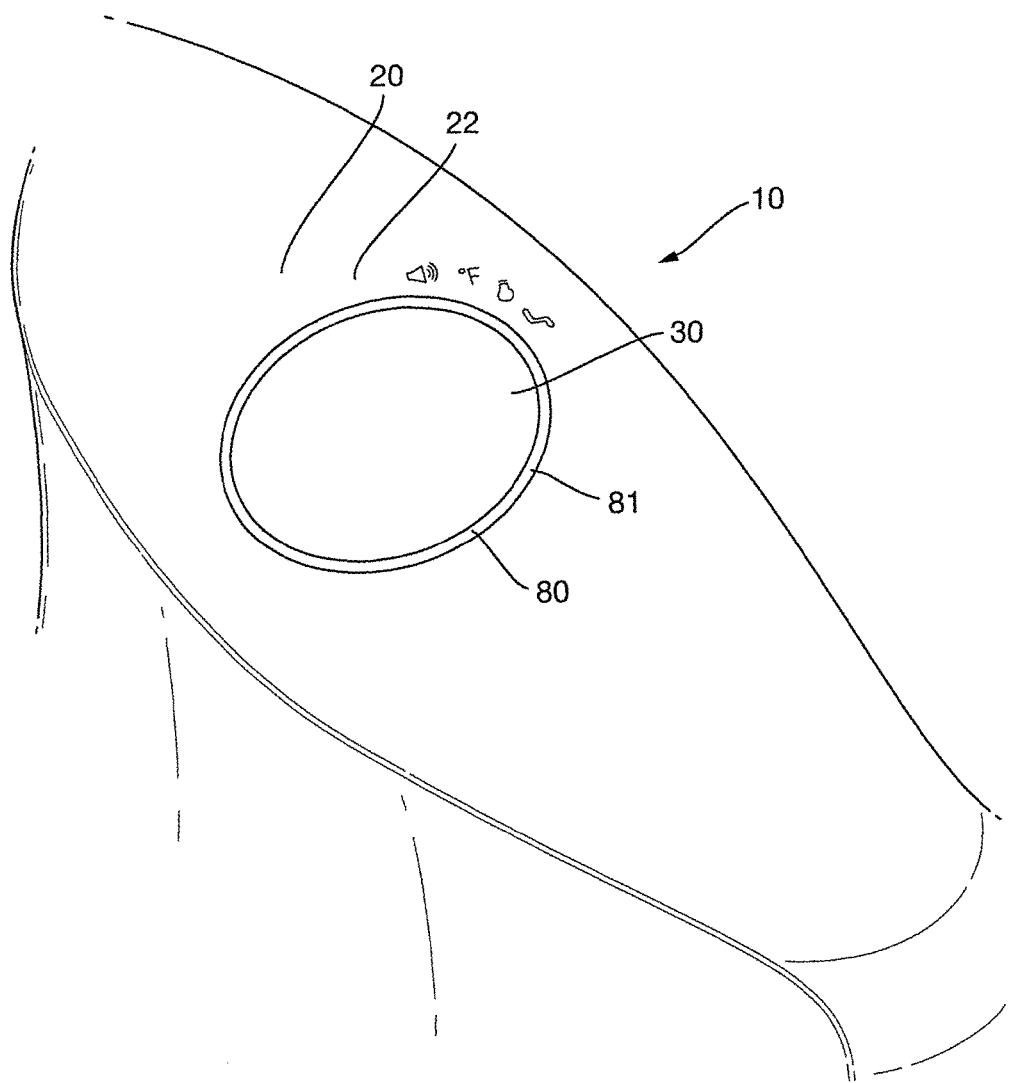
FIG. 1 is a schematic perspective view of a human interface assembly provided in an interior trim portion of a vehicle, according to a first embodiment.
Figure 2:
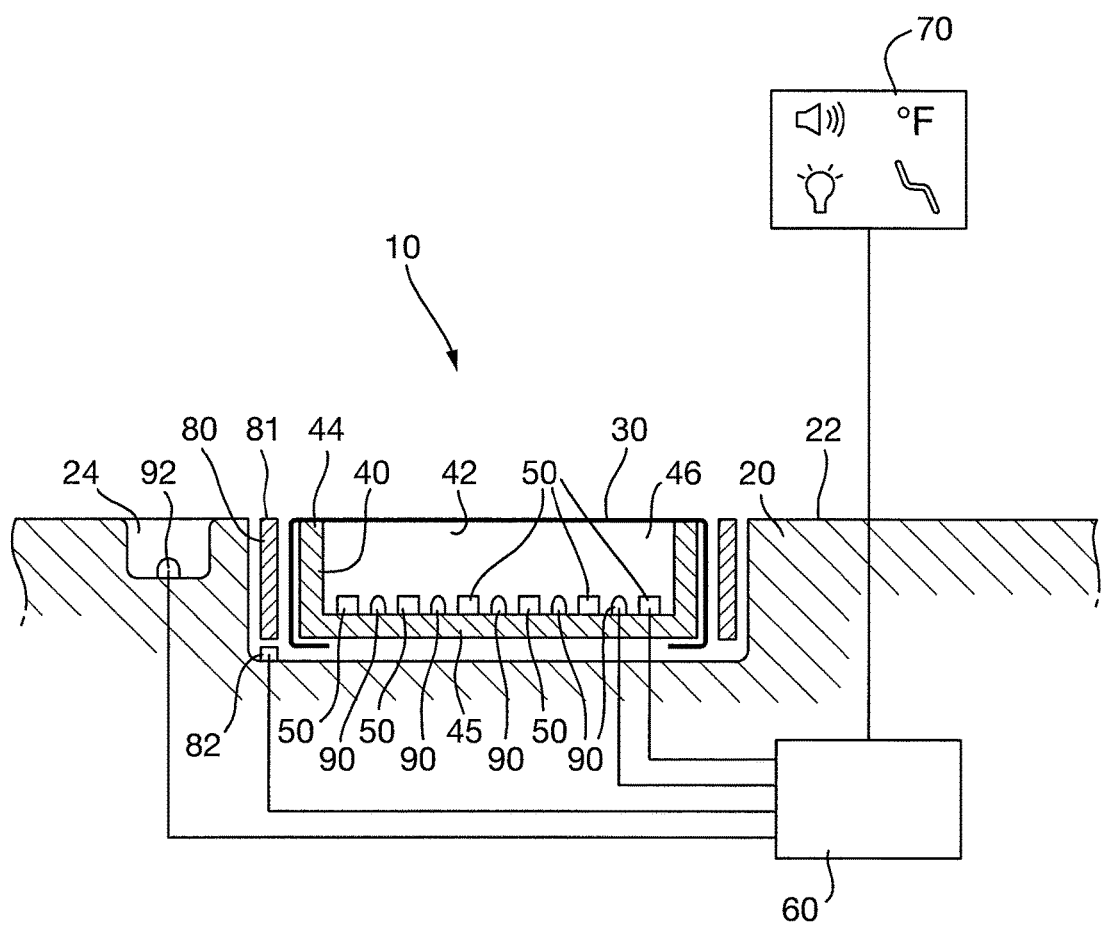
FIG. 2 is a schematic side sectional view of the human interface assembly of FIG. 1.

With reference to FIGS. 1 and 2, a vehicle human interface assembly 10 according to an arrangement of the present disclosure, comprises an interior trim portion 20 of a vehicle (such as an arm rest, central console, dashboard or any other trim portion), a flexible membrane 30 and an opening 42 or a frame 40 defining the opening 42 over which the flexible membrane 30 extends. The frame 40 defines the opening 42 over which the flexible membrane 30 extends. The flexible membrane 30 is under tension and is capable of being depressed by a user. A depression may be formed in the membrane as the user depresses the membrane. The depression may occur in a range of locations across the opening 42. The frame 40 is provided in the interior trim portion 20 such that the flexible membrane 30 and a surrounding surface 22 of the interior trim portion are substantially flush.

The frame 40 may be substantially circular with a tubular side wall 44 and a bottom wall 45. The opening 42 may be provided at the open end of the tubular side wall 44, whereas the bottom wall 45 may form a closed end of the tubular side wall 44. The flexible membrane 30 may extend over the open end of the frame 40. A cavity 46 may thus be formed between the bottom wall 45 and the flexible membrane 30.

The flexible membrane 30 may be resilient so that the flexible membrane may return to its original position after being depressed. The flexible membrane 30 may be substantially flat when it is not depressed by the user. An initial tension in the flexible membrane 30 may be sufficient to prevent an appreciable sag in the membrane, e.g. due to gravity. The flexible membrane 30 may have a resilience that permits the users to press the flexible membrane and feel a resistive restoring force. The restoring force felt by the user may be between 0 and 10 Newtons. The flexible membrane 30 may be made from a sheet or thin film material, such as a fabric, textile or cloth (whether woven or not). For example, the flexible membrane 30 may be made from leather, faux leather, plastic or cloth. The flexible membrane 30 may be made from the same material as the surface 22 of the interior trim portion 20. The flexible membrane 30 may be translucent so that light from beneath the flexible membrane 30 of a certain intensity may be visible to the user.

As best depicted in FIG. 2, the flexible membrane 30 may be wrapped around the frame 40. Edges of the flexible membrane 30 may be joined to the side walls 44 or the underside of the bottom wall 45. The flexible membrane 30 may be joined to the frame 40 in such a way so that the flexible membrane 30 is not puckered on its top surface.

The cavity 46 may be filled with a deformable fluid such as air. Alternatively, the cavity 46 may at least partially be filled with a liquid or gel (either of which may be provided in a separate sac) or a deformable solid. Such fillings may add to the resistance felt by the user when depressing the membrane 30 and may damp movement of the membrane 30. The filling may be resilient such that it tends to return the flexible membrane 30 to its original flat shape. For example, the cavity 46 may be filled with a sponge type material that is depressible, but returns to its original shape. However, it will be appreciated that the cavity filling may not necessarily be resilient, e.g. in the case of the filling being liquid, and the flexible membrane 30 may provide the restoring force to return the membrane and filling to their substantially flat pre-depressed position. The filling may be translucent so that light from beneath the filling of a certain intensity may be visible to the user.

The cavity 46 may have a depth greater than the maximum anticipated depth of the depression formed in the flexible membrane 30. This may ensure that the user does not feel the bottom of the cavity 46. The tension in the flexible membrane 30 may also be such that under normal operating conditions (e.g. maximum anticipated force applied by user), a user could not form a depression reaching a floor of the cavity.

The human interface assembly 10 further comprises one or more flexible membrane sensors 50. The flexible membrane sensors 50 are configured to determine the location at which the flexible membrane 30 has been depressed by the user. The flexible membrane sensors 50 provide a signal to a controller 60. The signal indicates to the controller 60 the location at which the flexible membrane has been depressed. The controller 60 in turn controls one or more systems 70 of the vehicle depending on the signal received from the flexible membrane sensors. In addition to sensing the location of the depression in the flexible membrane 30, the flexible membrane sensors 50 may also determine the extent, e.g. depth, of the depression.

In the arrangement depicted in FIG. 2, the human interface device 10 may comprise a plurality of flexible membrane sensors 50 in the form of proximity sensors. The proximity sensors may be configured to detect the presence of the depression in the membrane, e.g. when the depression is in the vicinity of a particular proximity sensor. The proximity sensors may be provided on the bottom wall 45 of the frame 40 and the proximity sensors may be distributed over the area defined by the bottom wall 45. Signals from the proximity sensors may be sent to the controller 60 and the controller 60 may determine the location of the depression based on which of the proximity sensors has sensed the presence of a depression in the flexible membrane 30. The proximity sensors may comprise an electromagnetic or acoustic emitter and a corresponding sensor that detects changes in the electromagnetic or acoustic field as the flexible membrane 30 is depressed. In the case of the cavity 46 being filled, the filling may be made from a material that does not significantly attenuate the electromagnetic or acoustic field. An optional layer may be provided on the underside of the flexible member 30 to reflect or diffuse such an electromagnetic or acoustic field to assist the proximity sensor in determining the presence of a depression.

The human interface assembly 10 may further comprise a ring 80 disposed about the frame 40. An edge 81 of the ring 80 may be substantially flush with the flexible membrane 30 and the surrounding surface 22 of the interior trim portion 20. The ring 80 may be touch sensitive such that when the user touches the edge 81 of the ring a signal is sent to the controller 60. Additionally or alternatively, the ring 80 may be rotatable with respect to the trim portion 20. A ring sensor 82 may determine the rotational position of the ring 80 and may send a signal to the controller 60 indicating a rotational position of the ring. Touching or rotating the ring 80 may control the vehicle system 70 or may switch between different vehicle systems 70 to be controlled.

The frame 40 may be movable, e.g. rotatable, relative to the surrounding surface 22 of the interior trim portion 20, according to one embodiment. A frame sensor (not shown) may determine the position of the frame 40. The vehicle system 70 may be controlled or selected by the position of the frame 40 relative to the trim portion 20. The frame 40 may be fixed relative to the trim portion 20, according to another embodiment.

As depicted in FIG. 2, the human interface assembly 10 may further comprise one or more light emitters 90. The light emitters 90 may be provided beneath the flexible membrane 30, e.g. in the cavity 46. In particular, the light emitters 90 may be provided on the bottom wall 45 of the frame 40. The light emitters 90 may project light onto the underside of the flexible membrane 30. The light may pass through the flexible membrane 30 such that it is subsequently visible to the user. The flexible membrane 30 may have a transparency that permits light from the light emitters 90 to be visible to the user, but otherwise does not permit the user to see inside the cavity 46. Light from the light emitters 90 may also be directional and focused on a particular location on the underside of the membrane 30. The flexible membrane 30 may subsequently diffuse the directional light from the light emitters 90 so that the image on the flexible membrane may be viewed from a range of locations. As shown in FIG. 2, a plurality of light emitters 90 may be provided and such light emitters may be distributed over the area of the bottom wall 45.

A transparent and substantially rigid intermediate layer may be provided above the light emitters 90 (and sensors 50) to provide a smooth surface in case the depression in the membrane 30 reaches the bottom of the cavity 46.

The light emitters 90 may each be capable of projecting an image to the underside of the flexible membrane 30. The image projected by each of the light emitters 90 may be fixed or the light emitter 90 may be capable of projecting a changing image. The light emitters may be configured so as to project light towards a particular location or a range of locations on the underside of the flexible membrane. The light emitters 90 may each emit a particular color or they each may be capable of emitting one or more colors.

The light emitters 90 may indicate to the user the particular system or sub-system of the vehicle being controlled. Furthermore, the light emitters 90 may indicate a setting value associated with the particular system of the vehicle being controlled. The light emitters 90 may also indicate to the user the location of the depression in the membrane and/or the extent of the depression in the membrane. For example, light from the flexible membrane may be coincident with the location of the depression. The color and/or intensity of the light may vary according to the pressure applied. Such light may provide useful feedback to the user.

The human interface assembly 10 may further comprise one or more further light emitters 92. The further light emitters 92 may be provided beneath the surface 22 of the surrounding trim portion 20. The further light emitters 92 may be provided in a recess 24 provided in the surrounding trim portion 20 and over which the surface 22 may extend. The further light emitters 92 may be capable of emitting an image which may vary in time. Alternatively, the further light emitters 92 may emit a fixed image or light that passes through a cut-out shape forming the image. The further light emitters 92 may emit directional light onto the surface 22. The light projected onto the surface 22 may pass through the surface and may be diffused so that it is visible to the user from a range of locations. The further light emitters 92 may indicate to the user the particular system of the vehicle being controlled. A plurality of further light emitters 92 may be provided and they may be distributed about the circumference of the flexible membrane 30 or a portion of said circumference. Additionally, one or more visual, e.g., light illumination, and/or haptic feedback devices may be employed to provide feedback of a human interface.

Figure 3A:
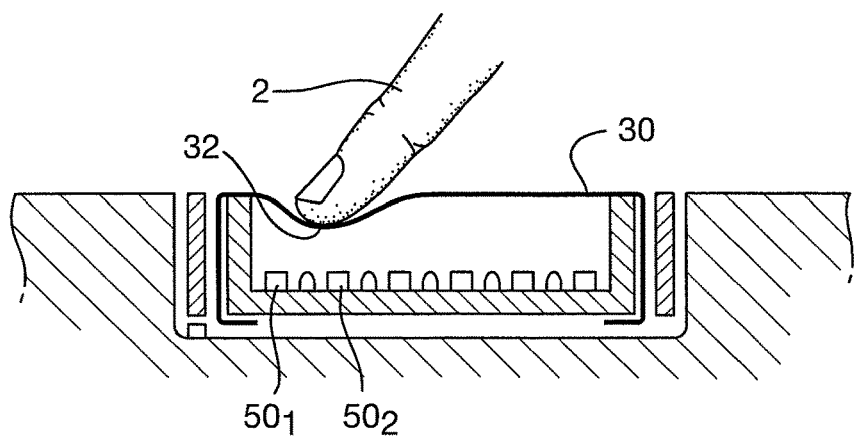
FIGS. 3a, 3b and 3c are schematic side sectional views of the human interface assembly of FIG. 1 and depict movement of a depression in the flexible membrane during a gesture.
Figure 3B:
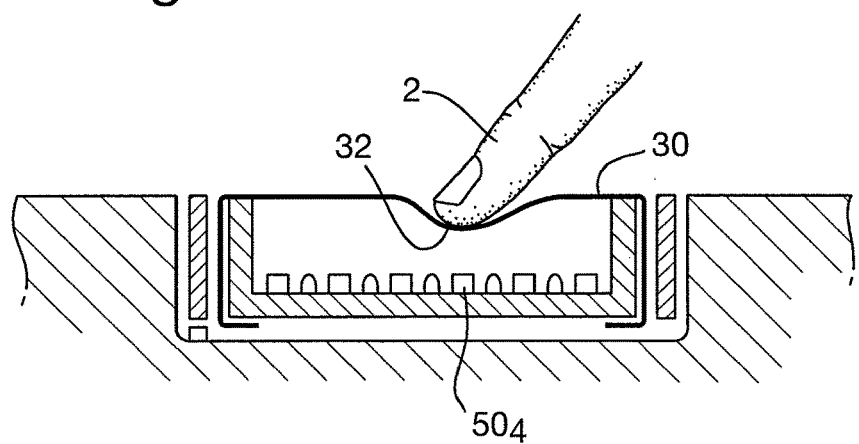
Figure 3C:
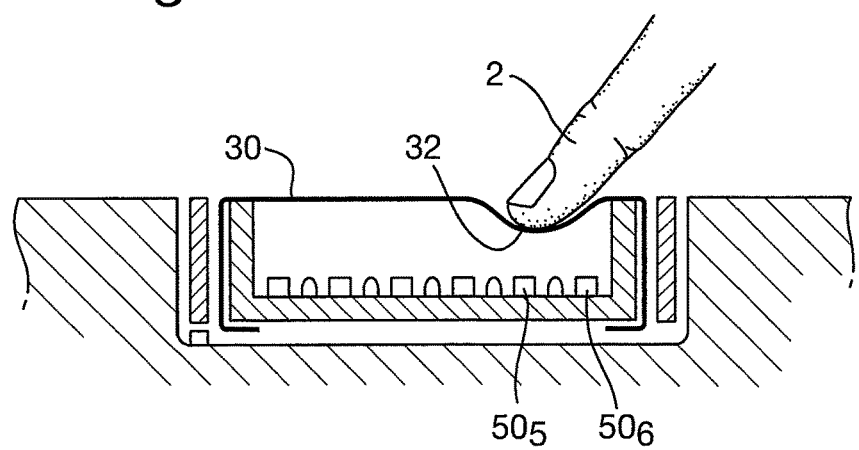

Referring now to FIGS. 3a, 3b and 3c, operation of a human interface assembly 10 will be described. As the user's finger 2 depresses the flexible membrane 30 a depression 32 is formed in the membrane. As depicted in FIG. 3a, the sensors $50_1$ and $50_2$ beneath the depression 32 may detect the presence of the depression 32 and thus send a signal to the controller 60. The controller 60 may interpolate the signals from the sensors $50_1$ and $50_2$ to determine where the depression 32 is between said sensors. The sensors $50_1$ and $50_2$ may also indicate the proximity of the depression 32 to the respective sensors. The controller 60 may thus be able to determine the depth of the depression 32 relative to the pre-depressed position of the flexible membrane 30. As depicted in FIG. 3b, when the user's finger 2 moves to a new location and continues to form a depression 32, the sensor $50_4$ may send a signal to the controller 60. As the depression 32 is immediately above the sensor $50_4$, the sensor $50_4$ may send the strongest or only signal to the controller 60. As the user's finger 2 continues to move, as shown in FIG. 3c, other sensors $50_5$ and $50_6$ may detect the presence of the depression 32 and send appropriate signals to the controller 60. In this way the controller 60 may be able to determine where the flexible membrane 30 has been depressed. Although FIGS. 3a-3c depicts sensors 50 in a single plane, it will be appreciated that additional sensors 50 may be provided out of the plane depicted in FIGS. 3a-3c so that the controller can also determine movements of the user's finger into and out of the plane depicted in FIGS. 3a-3c.

Figure 4A:
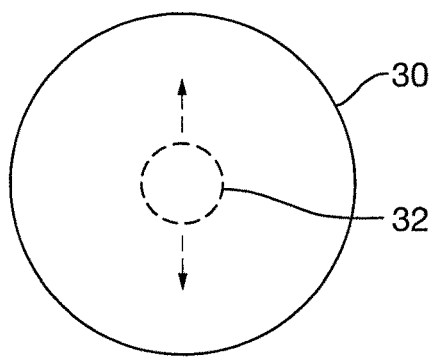
FIGS. 4a, 4b, 4c and 4d are plan views of the human interface assembly of FIG. 1 and depict a range of possible gestures.
Figure 4B:
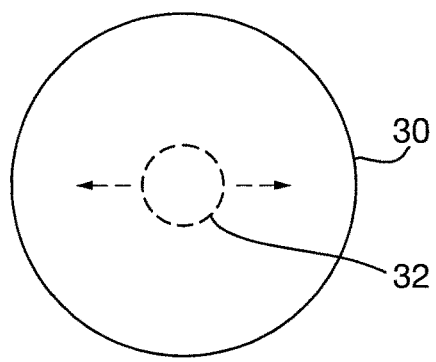
Figure 4C:
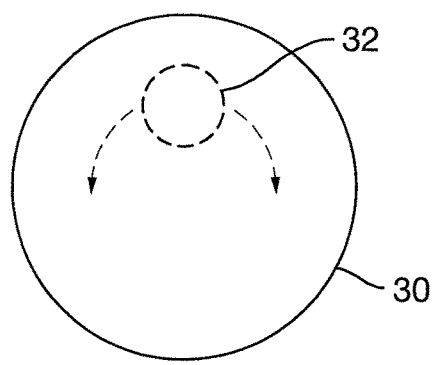
Figure 4D:
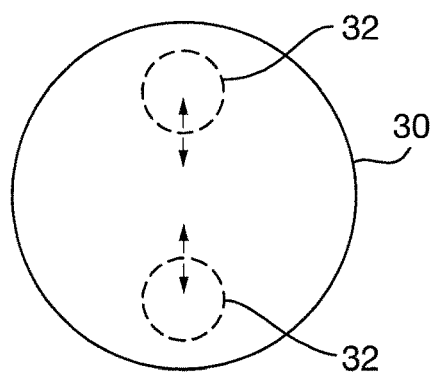

Referring now to FIGS. 4a-4d, the vehicle system 70 may be controlled or selected by one or more gestures generated by the user. The gestures may comprise changing the location of the depression 32 in the membrane 30 and the controller 60 may interpret these changes and control or select the vehicle system accordingly. For example, with reference to FIG. 4a, a first gesture may be substantially linear in a first direction. The first gesture may control a first characteristic of the vehicle system 70. As shown in FIG. 4b, a second gesture may be substantially linear in a second direction, which may be perpendicular to the first direction. The second gesture may control a second characteristic of the vehicle system 70. Alternatively, the second gesture may select a different vehicle system, sub-system or parameter to be controlled. As depicted in FIG. 4c a third gesture may be curved, for example following a circumference of the flexible membrane 30. The third gesture may control a third characteristic of the vehicle system 70 or select a different vehicle system, sub-system or parameter to be controlled. Turning now to FIG. 4d, a fourth gesture may comprise a multi-touch gesture in which the user uses two or more fingers to create two or more depressions 32 in the flexible membrane. The multi-touch gesture may comprise a pinch or expand type movement or the depressions 32 may remain at substantially the same distance apart but moving relative to one another. The fourth gesture may control a fourth characteristic of the vehicle system 70 or select a different vehicle system, sub-system or parameter to be controlled. Any of the gestures may result in moving up or down a menu tree of a vehicle system. Although four gestures have been described it will be appreciated that other movements of the depression 32 in the flexible membrane 30 may be monitored by the controller 60 and used to control the vehicle systems 70.

Figure 5A:
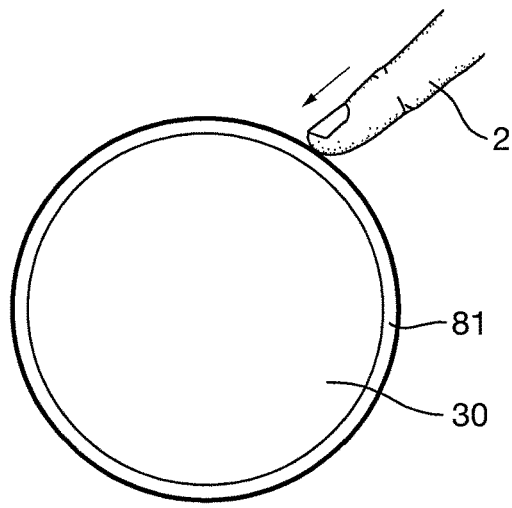
FIGS. 5a, 5b and 5c are plan views of the human interface assembly of FIG. 1 and depict a range of further possible gestures.
Figure 5B:
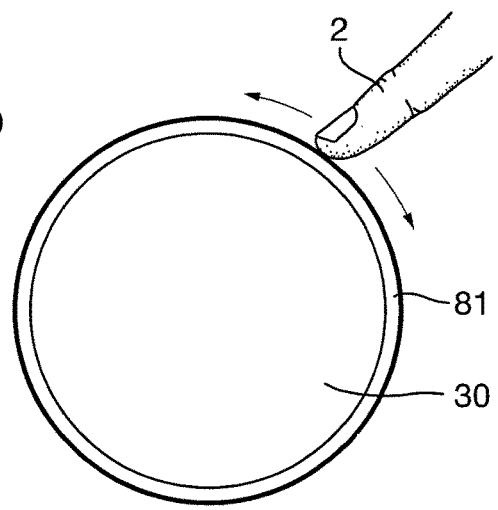
Figure 5C:
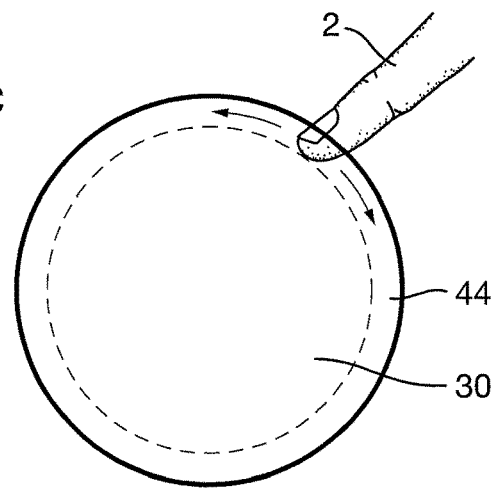

Referring now to FIGS. 5a, 5b and 5c operation of the ring 80 will now be described. As previously mentioned, the ring 80 may be touch sensitive and merely touching the edge 81 of the ring 80 may send a signal to the controller 60, as depicted in FIG. 5a. Touching the ring 80 may result in a variable of the system being controlled changing or may result in a different vehicle system, sub-system or parameter being selected. As depicted in FIG. 5b, the ring 80 may be rotated by the user's finger 2 by touching the edge 81 of the ring and rotating the ring accordingly. Again, the ring 80 may be used to select the vehicle system or sub-system to be controlled or vary a variable or parameter of the particular vehicle system currently being controlled. Additionally or alternatively, the flexible membrane 30 and the accompanying frame 40 may be rotated by the user as depicted in FIG. 5c. For example, the user's finger 2 may engage the side wall 44 of the frame 40 and in the case of the frame 40 being rotatable may rotate a frame. Rotation of the frame 40 and the flexible membrane 30 may control a variable of the vehicle system currently being controlled or select a different vehicle system or sub-system to control.

Figure 6A:
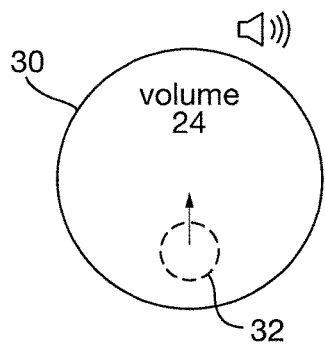
FIGS. 6a, 6b, 6c, 6d and 6e are plan views of the human interface assembly of FIG. 1 and depict a scenario in which different parameters of a vehicle audio system may be controlled by the human interface assembly.
Figure 6B:
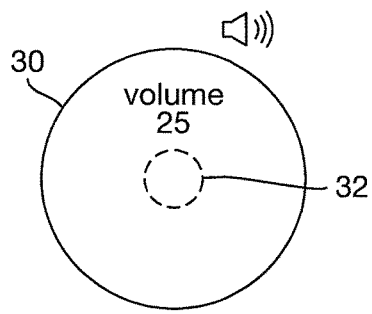
Figure 6C:
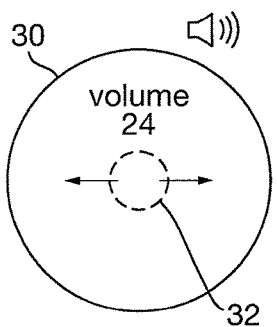
Figure 6D:
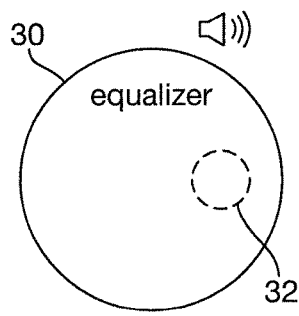
Figure 6E:
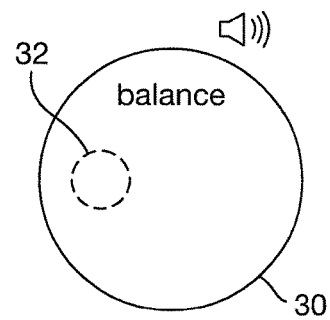

With reference to FIGS. 6a-7c, exemplary modes of operation will now be described. The volume of an audio sound system may be adjusted by moving the depression 32 in the membrane 30 in a first direction, for example from the position depicted in FIG. 6a to the position depicted in FIG. 6b. The light emitters 90 may display the vehicle system or subsystem that is being controlled, in this case the audio system volume, and the value of a particular variable, for example the volume level. The further light emitters 92 may also display the vehicle system being controlled, for example in the case of FIGS. 6a-6e, an image representing the audio sound system. The volume may be increased by moving the depression 32 in a vertical direction and the volume may be subsequently decreased by moving the depression 32 in the reverse direction. The subsystem to be controlled may be varied by moving the depression 32 in a second direction, e.g. as depicted in FIGS. 6c, 6d and 6e. For example, by moving the depression 32 in the second direction, e.g. sideways, the equalizer or balance controls or any other control of the vehicle sound system may be selected. These subsystems may be selected by scrolling through a list of such subsystems. The light emitters 90, 92 may display the subsystem to be controlled. The value of the particular parameter within a subsystem may be changed by moving the depression 32 in the first direction, e.g. as depicted in FIGS. 6a and 6b. Although FIGS. 6a-6e relate to an audio sound system of the vehicle, it will be appreciated that other systems of the vehicle may controlled in a similar manner, for example adjustable seats, adjustable mirrors, climate control systems, lighting, navigation systems, communication systems or any other system or sub-system of the vehicle.

Figure 7A:
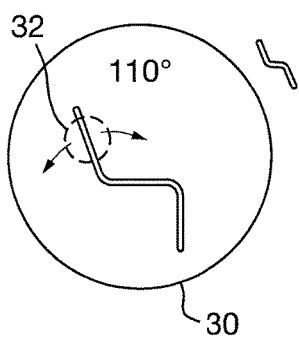
FIGS. 7a, 7b and 7c are plan views of the human interface assembly of FIG. 1 and depict a scenario in which different parameters of a vehicle seat may be controlled by the human interface assembly.
Figure 7B:
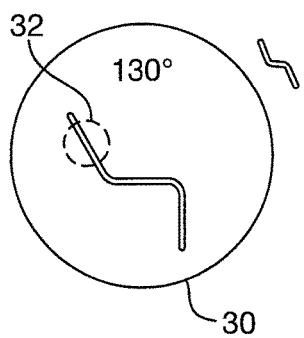
Figure 7C:
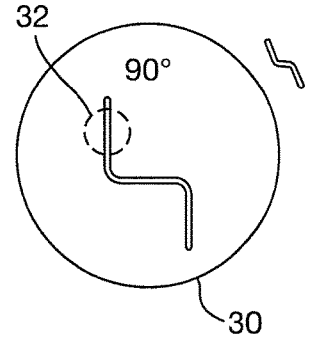

With reference to FIGS. 7a, 7b and 7c, the light emitters 90 may generate a graphical representation of the vehicle system to be controlled. In particular, the graphical representation may be interactive such that the image generated by the light emitters 90 changes according to the selected value of the parameter. For example, in the case of the human interface device 10 controlling an adjustable seat, the light emitters 90 may project an image onto the flexible membrane 30 that represents the adjustable seat. As a parameter of the seat is varied by movement of the depression 32, the image of the seat may be adjusted accordingly, thereby giving the user useful feedback. For example, if the inclination of the seat back is changed by moving the depression, the image projected onto the flexible membrane 30 may be changed to show the new seat back inclination. Furthermore, the controller 60 may be configured to respond to movement of a depression 32 in the region of the illuminated component part that is to be controlled. The direction of movement of the user's finger may correspond to the direction of the changed variable. For example, if the user generates a depression 32 in the region of where a seat back is displayed on the flexible membrane, movement of the depression 32 may adjust the seat back accordingly. Thus, as shown in FIG. 7b if the depression is moved rearwards the seat back may recline. By contrast, if the depression 32 moves forwards, as depicted in FIG. 7c, the seat back may move to a more upright position. In addition to depicting a graphical representation of the system being controlled, the light emitters 90 may also display a value that indicates to the user the value of the variable being controlled. Although FIGS. 7a-7c shows the human interface device 10 controlling a seat, it will be appreciated that an interactive graphical representation may also be used to control other systems of the vehicle, e.g. such as lighting zones, mirror positions, etc.

Figure 8:
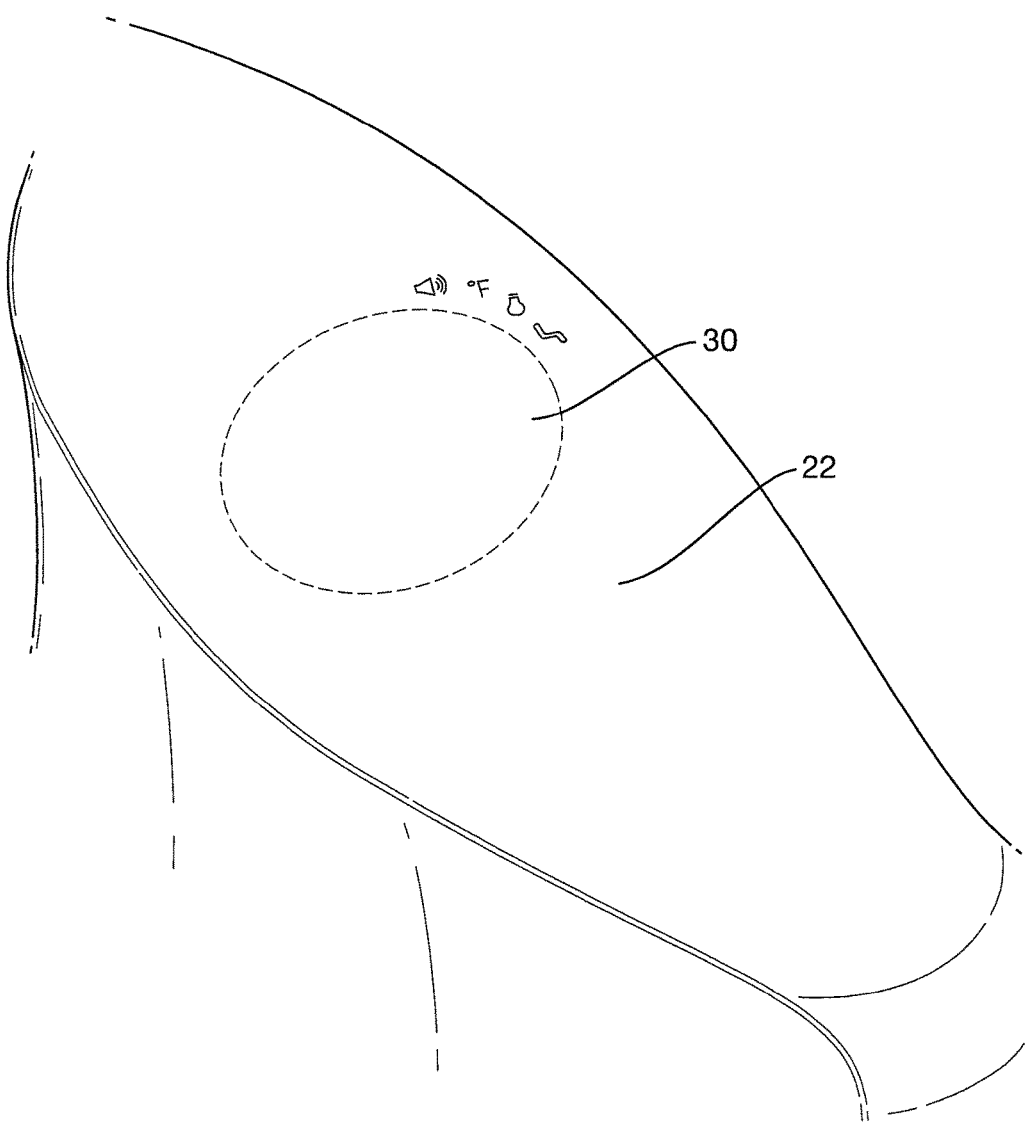
FIG. 8 is a schematic perspective view of a human interface assembly provided in an interior trim portion of a vehicle according to a second embodiment alternative embodiment.

With reference to FIG. 8, in an alternative arrangement of the present disclosure, the flexible membrane 30 may be unitary with the surface 22 of the surrounding trim portion. Accordingly, the flexible membrane portion 30 may not necessarily be wrapped around the frame 40, which may or may not be unitary with the trim portion 20. Having a unitary trim surface may present a smooth and seamless surface to the user. Markings on the flexible membrane 30 may indicate to the user where depressions may be applied to control the vehicle systems.

With reference to FIGS. 9a-11, other sensor types may be used to determine the location and/or extent of the depression 32 in the flexible membrane 30. For example, the sensors may comprise one or more cameras that monitor the underside of the flexible membrane 30. The controller 60 may then be able to determine from images captured by the cameras the location and/or extent of the depression 32. To aid the determination of the location of the depression 32, the underside of the flexible membrane 30 may be provided with an image 130, 230 printed on the underside of the flexible membrane. As depicted in FIGS. 9a and 9b, the image 130 may comprise a series of concentric circles. FIG. 9a shows the flexible membrane 30 in an unperturbed position in which the concentric circles appear concentric. FIG. 9b shows a perturbed position of the flexible membrane 30 with a depression 32 having been formed. The distorted image captured by the camera sensors allows the controller 60 to determine the location and/or extent of the depression 32.

Referring to FIGS. 10a and 10b, an alternative image 230 on the underside of the flexible membrane 30 may be provided. In FIGS. 10a and 10b the image 230 comprises a grid pattern, which as shown in FIG. 10a comprises a series of parallel straight lines in a first direction and a series of parallel straight lines in a second direction perpendicular to the first direction. FIG. 10a represents the image captured by the camera sensors in an unperturbed state of the flexible membrane 30, whereas FIG. 10b shows the distorted image when the flexible membrane has been depressed. The distortion of the image 230 allows the controller 60 to determine the extent and location of the depression 32.

In a further alternative arrangement, the sensors used to determine the location and/or extent of the depression may comprise one or more conductors 330 that extend across the membrane 30. The conductors 330 may be provided on one side of the flexible membrane 30 or they may pass through the flexible membrane, e.g. being threaded through the material forming the flexible membrane. The electrical conductors 330 may be arranged in a grid like pattern and changes in the resistance and/or capacitance of the electrical conductors 330 may be measured to determine the location and/or extent of a depression in the membrane. In a similar fashion, lighting elements may also be provided in the flexible membrane 30 in addition to or instead of the light emitters 90.

Accordingly, a motor vehicle human interface assembly is disclosed herein. The assembly includes a motor vehicle human interface assembly. The assembly includes an interior trim portion of a motor vehicle, a flexible membrane, and a frame defining an opening, the flexible membrane extending over the opening such that the flexible membrane is initially in tension, wherein the flexible membrane is capable of being depressed by a user to form a depression in the membrane in a range of locations within the opening. The assembly also includes one or more flexible membrane sensors configured to determine the location at which the flexible membrane has been depressed by the user, the one or more flexible membrane sensors providing a signal indicating the location at which the flexible membrane has been depressed. The assembly further includes a controller configured to control one or more systems of the motor vehicle based on the signal from the one or more flexible membrane sensors, wherein the frame is provided in the interior trim portion such that the flexible membrane and a surrounding surface of the interior trim portion are substantially flush.

The vehicle system may be controlled or selected by one or more gestures generated by the user. The gestures may comprise changing the location of the depression in the membrane. The controller may be configured to interpret the one or more gestures. Characteristics or variables of the systems to be controlled may comprise values of an attribute of the system or sub-system or any other variable, such as a position in a menu tree. A first gesture may control a first characteristic of the vehicle system. A second gesture may control a second characteristic of the vehicle system. A third gesture may select a different system of the vehicle to be controlled. The gestures may comprise curved, linear and/or multi-touch (pinch, expand etc.) movements on the membrane.

The flexible membrane may comprise a fabric, textile or cloth (whether woven or not), and may be made from leather, polymers or any other sheet or thin film material. The flexible membrane may be resilient such that the flexible membrane may return to its original position after being depressed. The tension in the flexible membrane may be such that the membrane is substantially flat over the frame prior to being depressed. The tension in the flexible membrane may permit the user to depress the flexible membrane and feel a resistance, e.g. of the order of 1 to 10 N.

A cavity may be provided beneath the flexible membrane. The cavity may be at least partially filled with air. Additionally or alternatively, the cavity may be at least partially filled with a liquid or gel (e.g. provided in a sac) or a deformable solid situated beneath the flexible membrane. Such fillings may add to the resistance felt by the user when depressing the membrane and may damp movement of the membrane. The filling may be resilient, e.g. tending to return to its original shape. However, the filling may not be resilient with the flexible membrane providing the restoring force to return the membrane to a substantially flat pre-depressed position. The one or more flexible membrane sensors may be further configured to determine the extent of the depression.

The flexible membrane may be wrapped around an edge of the frame, e.g. the flexible membrane may be separate from the surrounding surface of the interior trim portion. Alternatively, the flexible membrane may extend over the frame and may be integral with the surrounding surface of the interior trim portion. For example, the flexible membrane may be made from the same sheet of material that covers the surrounding trim portion.

The vehicle human interface assembly may comprise a plurality of flexible membrane sensors and a processor. The processor may be configured to determine the location of the depression based on a comparison of the signals from the plurality of flexible membrane sensors. The flexible membrane sensors may comprise a plurality of electrical conductors extending across the membrane. For example, the flexible membrane sensors may be configured to determine changes in a resistance and/or capacitance associated with the electrical conductors when the membrane is depressed. A resistance or capacitance between or of the wires may change as the flexible membrane is deformed, e.g. due to changes in the spacing of the electrical conductors. Additionally or alternatively, the resistance or capacitance may change due to contact with the user and may change due to pressure exerted by user. The electrical conductors may be arranged in a grid. The electrical conductors may be woven into the flexible membrane.

The flexible membrane sensors may comprise one or more optical sensors provided beneath the membrane. The optical sensors may be configured to monitor an underside of the membrane to determine the location at which the flexible membrane has been depressed by the user. The extent of the depression may also be determined by monitoring the underside of the membrane. For example, an image may be provided on the underside of the membrane. The image may be distorted by the depression of the membrane. The distortion may be detectable by the optical sensor to determine the location and/or extent of the depression. The image may comprise a series of concentric circles, a grid pattern or any other pattern that would allow a processor to deduce the location (and optionally the extent) of the depression with data from the optical sensor.

The flexible membrane sensors may comprise one or more proximity sensors provided behind the membrane. The proximity sensors may be configured to detect the presence of the depression in the membrane, e.g. as the flexible membrane moves towards the proximity sensor. The proximity sensors may comprise an electromagnetic or acoustic emitter and a corresponding sensor that detects changes in the electromagnetic or acoustic field. A suitable layer of material on the underside of the flexible membrane may be provided to facilitate reflection or diffusion of such an electromagnetic or acoustic field. The proximity sensors may be provided behind the flexible membrane, for example a plurality of proximity sensors may be distributed over a region behind the flexible membrane.

The frame may be circular. The frame may be fixed or rotatable relative to the surrounding surface of the interior trim portion. The vehicle human interface assembly may further comprise a frame sensor configured to determine the rotational position of the frame. The controller may be configured to control one or more further systems of the vehicle based on the signal from the one or more flexible membrane sensors. The vehicle system to be controlled may be determined by the rotational position of the frame.

The vehicle human interface assembly may further comprise a ring disposed around the frame. An edge of the ring may be substantially flush with the flexible membrane and a surrounding surface of the interior trim portion. The ring may be configured to be touch sensitive such that touching the ring may send a signal to the controller, e.g. to indicate that a variable of the system to be controlled may be changed or to change the system to be controlled. The ring may be rotatable. A ring sensor may be configured to determine the rotational position of the ring. The controller may be configured to control one or more further systems of the vehicle based on the signal from the one or more flexible membrane sensors. The vehicle system to be controlled may be determined by the rotational position of the ring.

The vehicle human interface assembly may further comprise one or more light emitters configured such that light from the light emitters may project from the flexible membrane and may be visible to the user. For example, the light emitters may be spaced apart from the flexible membrane and may project light onto an underside of the flexible membrane. The light emitters may be provided at a bottom of the cavity and project light through the cavity towards the flexible membrane. Alternatively, the light emitters may be provided on or within the flexible membrane.

The light emitters may indicate the system of the vehicle being controlled. The light emitters may indicate a setting value associated with the system of the vehicle being controlled. The light emitters may indicate the location of the depression in the membrane and/or extent of the depression in the membrane, e.g. light from the flexible membrane may be coincident with the location of the depression. The color and/or intensity of the light may vary according to the pressure applied.

The light from the light emitters may generate a graphical representation of the vehicle system to be controlled. The graphical representation may be interactive such that the location and/or movement of the depression in the membrane correspond to a location and/or movement of the vehicle system. The graphical representation of the vehicle system may change following such interaction. For example, the graphical representation may comprise an image of an adjustable seat to be controlled. Depressing the membrane where a seat back appears on the membrane may adjust the position of the seat back. Movement of the depression in the membrane may be in a direction corresponding to the direction the user wishes to move the seat back.

The vehicle human interface assembly may further comprise one or more further light emitters configured such that light from the further light emitters may project from the surrounding surface of the interior trim portion and may be visible to the user. For example, the further light emitters may be configured to project light onto an underside of the surrounding surface of the interior trim portion. The further light emitters may indicate the system of the vehicle being controlled or any other value.

It will be appreciated by those skilled in the art that although the invention has been described by way of example, with reference to one or more examples, it is not limited to the disclosed examples and alternative examples may be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle human interface assembly comprising:
   an interior trim portion of a motor vehicle;
   a flexible membrane;
   an opening, the flexible membrane extending over the opening such that the flexible membrane is initially in tension, wherein the flexible membrane is capable of being depressed by a user to form a depression in the flexible membrane in a range of locations within the opening, and wherein the flexible membrane has restoring force in a range of from about 1 Newton to about 10 Newtons such that the flexible membrane returns to an initial position after being depressed;
   a frame positioned within the opening and being flush mounted with a surrounding surface of the interior trim portion, wherein the flexible membrane is substantially flush with the surrounding surface of the interior trim portion;
   one or more flexible membrane sensors configured to determine the location at which the flexible membrane has been depressed by the user, the one or more flexible membrane sensors providing a signal indicating the location at which the flexible membrane has been depressed; and
   a controller configured to control one or more systems of the motor vehicle based on the signal from the one or more flexible membrane sensors.

2. The motor vehicle human interface assembly of claim 1, wherein the one or more flexible membrane sensors are further configured to determine the extent of the depression.

3. The motor vehicle human interface assembly of claim 1, wherein the motor vehicle system is controlled or selected by one or more gestures generated by the user changing the location of the depression in the flexible membrane, the controller being configured to interpret the one or more gestures.

4. The motor vehicle human interface assembly of claim 3, wherein a first gesture controls a first characteristic of the motor vehicle system, a second gesture controls a second characteristic of the motor vehicle system, and a third gesture selects a different system of the motor vehicle to be controlled.

5. The motor vehicle human interface assembly of claim 1, wherein the flexible membrane comprises a fabric.

6. The motor vehicle human interface assembly of claim 1, wherein the flexible membrane is resilient such that the flexible membrane returns to its original position after being depressed.

7. The motor vehicle human interface assembly of claim 1, wherein a cavity is provided beneath the flexible membrane, the cavity being at least partially filled with a deformable fluid or solid.

8. The motor vehicle human interface assembly of claim 1, wherein the frame defines the opening and the flexible membrane is wrapped around an edge of the frame.

9. The motor vehicle human interface assembly of claim 1, wherein the motor vehicle human interface assembly comprises a plurality of flexible membrane sensors and a processor, the processor being configured to determine the location of the depression based on a comparison of the signals from the plurality of flexible membrane sensors.

10. The motor vehicle human interface assembly of claim 1, wherein the one or more flexible membrane sensors comprises a plurality of electrical conductors extending across the flexible membrane, the one or more flexible membrane sensors being configured to determine changes in a resistance and/or capacitance associated with the electrical conductors when the flexible membrane is depressed.

11. The motor vehicle human interface assembly of claim 1, wherein the one or more flexible membrane sensors comprise an optical sensor provided beneath the flexible membrane, the optical sensor being configured to monitor an underside of the flexible membrane to determine the location at which the flexible membrane has been depressed by the user, and wherein an image is provided on the underside of the flexible membrane and the image is distorted by the depression of the flexible membrane, the distortion being detectable by the optical sensor to determine the location and/or extent of the depression.

12. The motor vehicle human interface assembly of claim 1, wherein the one or more flexible membrane sensors comprise one or more proximity sensors provided beneath the flexible membrane, the one or more proximity sensors being configured to detect the presence of the depression in the flexible membrane.

13. The motor vehicle human interface assembly of claim 1, further comprising: a frame defining the opening, wherein the frame is rotatable relative to the surrounding surface of the interior trim portion, the motor vehicle human interface assembly further comprising a frame sensor configured to determine the rotational position of the frame, and wherein the controller is configured to control one or more further systems of the motor vehicle based on the signal from the one or more flexible membrane sensors, the system to be controlled being determined by the rotational position of the frame.

14. The motor vehicle human interface assembly of claim 1, wherein the motor vehicle human interface assembly further comprises:
 a frame defining the opening;
 a rotatable ring disposed around the frame, an edge of the ring being substantially flush with the flexible membrane and a surrounding surface of the interior trim portion; and
 a ring sensor configured to determine the rotational position of the ring, and wherein the controller is configured to control one or more further systems of the motor vehicle based on the signal from the one or more flexible membrane sensors, the system to be controlled being determined by the rotational position of the ring.

15. The motor vehicle human interface assembly of claim 1, wherein the motor vehicle human interface assembly further comprises one or more light emitters configured such that light from the light emitters projects from the flexible membrane and is visible to the user.

16. The motor vehicle human interface assembly of claim 15, wherein the light emitters indicate one or more of the system of the motor vehicle being controlled, a setting value associated with the system of the motor vehicle being controlled, and the location of the depression in the flexible membrane and/or extent of the depression in the flexible membrane.

17. The motor vehicle human interface assembly of claim 15, wherein the light from the light emitters generates a graphical representation of the motor vehicle system to be controlled, the graphical representation being interactive such that the location and/or movement of the depression in the flexible membrane corresponds to a location and/or movement of the motor vehicle system and causes the graphical representation of the motor vehicle system to change.

18. The motor vehicle human interface assembly of claim 15, wherein the motor vehicle human interface assembly further comprises one or more further light emitters configured such that light from the further light emitters projects from the surrounding surface of the interior trim portion and is visible to the user.

19. A vehicle interface assembly comprising:
 a flexible membrane extending over an opening, wherein the flexible membrane is under tension and substantially flat prior to being depressed;
 a flexible membrane sensor configured to determine a depressed location of the flexible membrane within the opening;
 a touch sensitive and rotatable ring positioned about the opening; and
 a controller controlling one or more systems based on the depressed location and a signal generated by the ring.

20. A motor vehicle human interface assembly comprising:
 an interior trim portion of a motor vehicle;
 a flexible membrane;
 an opening, the flexible membrane extending over the opening such that the flexible membrane is initially in tension, wherein the flexible membrane is capable of being depressed by a user to form a depression in the flexible membrane in a range of locations within the opening;
 one or more flexible membrane sensors configured to determine the location at which the flexible membrane has been depressed by the user, the one or more flexible membrane sensors providing a signal indicating the location at which the flexible membrane has been depressed;
 a controller configured to control one or more systems of the motor vehicle based on the signal from the one or more flexible membrane sensors; and
 a frame is provided in the interior trim portion such that the flexible membrane and a surrounding surface of the interior trim portion are substantially flush, wherein the frame defines the opening and the flexible membrane extends over the frame and is integral with the surrounding surface of the interior trim portion.

* * * * *